UNITED STATES PATENT OFFICE.

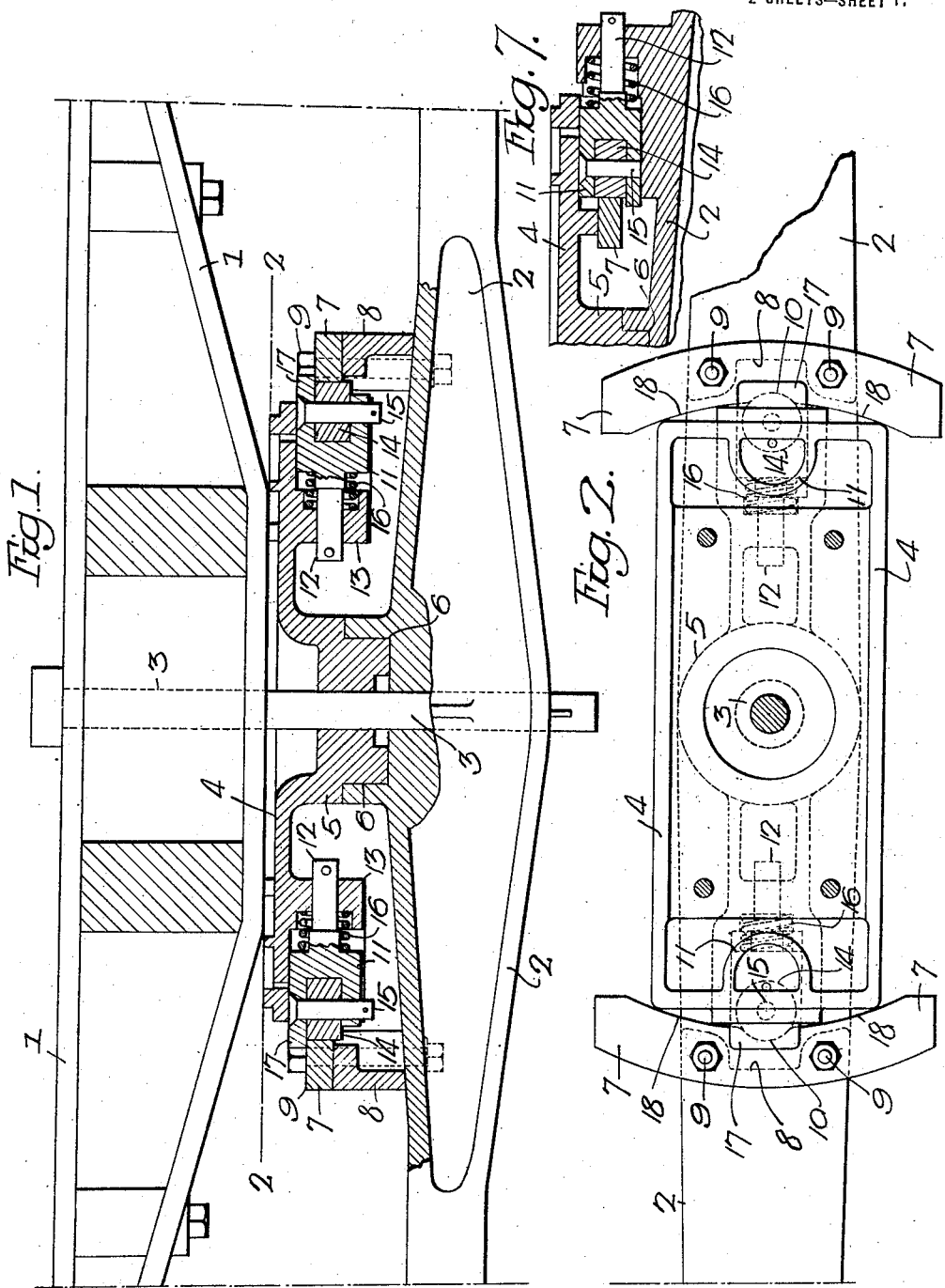

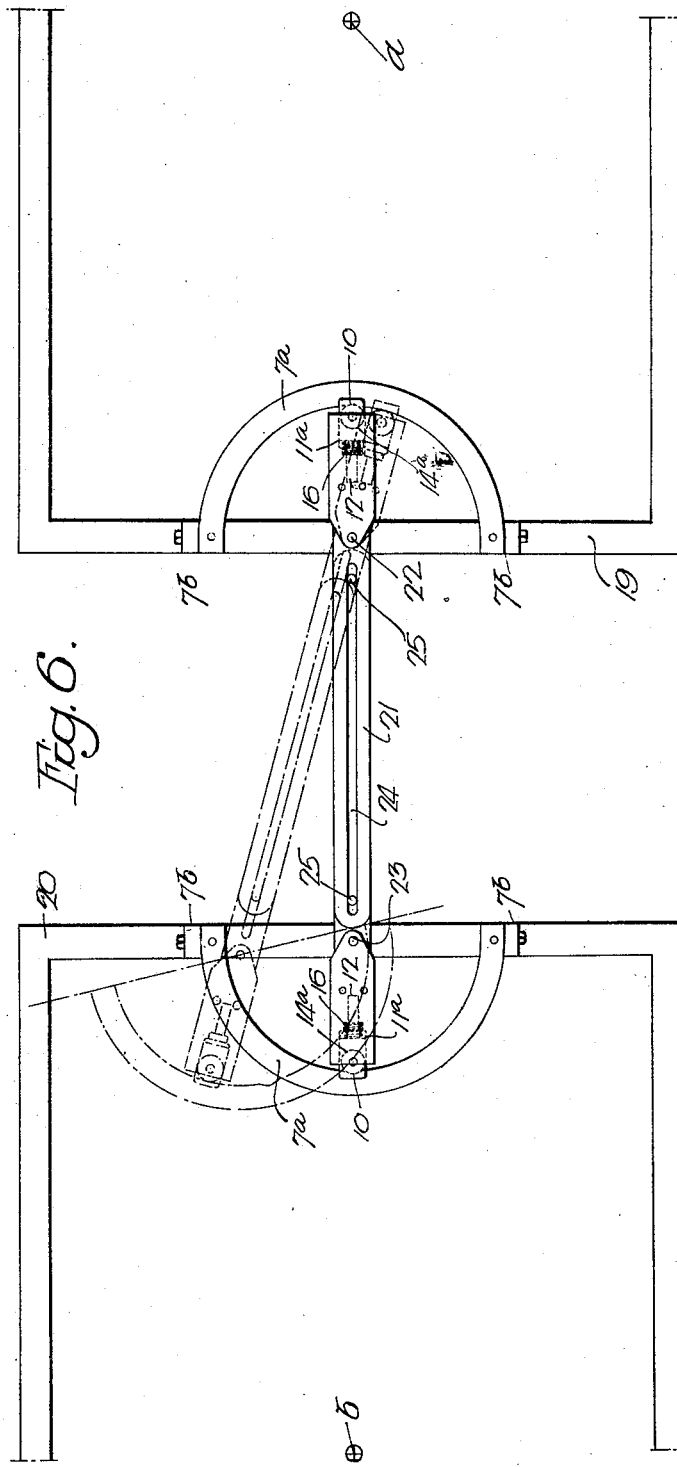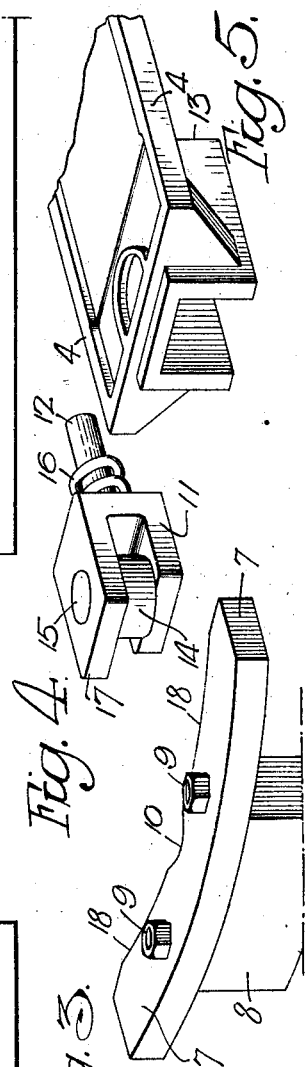

MORRIS LINTON, OF MOORESTOWN, NEW JERSEY, ASSIGNOR TO THE BALDWIN LOCOMOTIVE WORKS, OF PHILADELPHIA, PENNSYLVANIA, A CORPORATION OF PENNSYLVANIA.

ANTINOSING DEVICE FOR RAILROAD CARS.

1,408,371.  Specification of Letters Patent.  Patented Feb. 28, 1922.

Application filed December 23, 1921. Serial No. 524,490.

*To all whom it may concern:*

Be it known that I, MORRIS LINTON, a citizen of the United States, residing in Moorestown, Burlington County, New Jersey, have invented certain Improvements in an Antinosing Device for Railroad Cars, of which the following is a specification.

The object of my invention is to provide means for preventing the nosing, or swaying, of a railroad car, particularly of the electric, or trolley, type, where a single car is driven by its own motor.

This object I attain in the following manner, reference being had to the accompanying drawings, in which:

Fig. 1 is a view of a portion of the body bolster and the truck bolster of a car, partly in section;

Fig. 2 is a sectional plan view on the line 2—2, Fig. 1;

Fig. 3 is a detached perspective view of the notched plate forming part of the antinosing device;

Fig. 4 is a perspective view of the roller plunger of the anti-nosing device;

Fig. 5 is a perspective view of one end of the pivot plate; and

Figs. 6 and 7 are views of modifications of the invention.

Referring to the drawings, 1 is the body bolster, which is secured to the car body, or forms a part thereof. 2 is the truck bolster, which is mounted on the ordinary swing truck. 3 is a king bolt, or pivot pin, which extends through both bolsters, as shown. Secured to the body bolster is the pivot plate 4, rectangular in shape, and having a central projection 5 surrounding the king bolt and extending into a socket 6 formed in the truck bolster 2.

7, 7 are two curved plates mounted on a block 8 secured to the truck bolster 2 by bolts 9. The curve of each plate is taken from the pivot center of the truck and the plates are notched at the center, as at 10. Depending from the pivot plate 4 is a housing 13 is which is located a plunger 11 having a stem 12, which extends through the rear of the housing. Carried by each plunger 11 is a roller 14 mounted on a vertical pivot pin 15. Between the back of the plunger and the housing 13 is a coiled spring 16. The upper portion 17 of the plunger extends over the plate 7, as clearly shown in Fig. 1.

In the present instance, there is a plunger at each side of the plate 4, and there are two curved plates 7. In some instances, a single plate may be used and a single plunger.

While the plate 7 is shown separate from the truck bolster, it may be made integral therewith. In some cases, it may be carried by the truck bolster and the curved plate may be secured to, or may form part of, the pivot plate, or body bolster, as shown in Fig. 7.

When the car is traveling on a straight track, each roller 14 is projected into the notch 10 of its plate 7 so that the tendency of the truck to swing on its pivot is prevented by the rollers, which are yieldingly mounted on the plate. The notch 10 is shallow so that, when the truck strikes a curve, it is turned positively on its pivot, pushing back the plunger carrying the roller. The roller will travel on the curved portion 18 of the plate, but, as soon as the truck passes the curve and is in position on a straight track, the plunger will be projected and its roller will enter its notch in the plate.

A modification of the invention is shown in Fig. 6, in which 19 and 20 are the frames of two trucks, the truck 19 being pivoted at $a$ to the body of the car and the truck 20 being pivoted at $b$ to the body of the car. A plate having a curved section $7^a$ is pivoted at $7^b$ to each truck frame, and a bar 21 extends from one plate to the other, being pivoted at 22 to the plate on the frame 19, and at 23 to the plate on the frame 20. The bar is made in two sections, one telescoping with the other. Each section of the bar 21 is slotted at 24, and a pin 25, on the other bar, extends into the slot so that, when the car is passing around a curve, one section of the bar slides upon the other. A plunger $11^a$ is mounted in each section of the bar. Each plunger is preferably provided with a roller $14^a$ adapted to a notch in a curved plate $7^a$, the notch being centrally located so that the rollers are projected into the notches when the car is traveling on a straight track, but, when the car passes around a curve, the two trucks accommodate themselves to the curve and the rollers are forced out of the notches and travel on the curved edges of the plates $7^a$.

While the plunger 11 is shown provided with an anti-friction roller 14, a shoe may be substituted for the roller. This shoe may be made integral with the plunger, or may be a separate piece secured thereto.

I claim:

1. The combination in an anti-nosing device for cars, of a spring-pressed plunger carried by one part of the car; and a curved notched plate carried by another portion of the car, the notch in the curved plate being so located that the plunger will rest in the curved plate when the car is traveling on a straight track, but will be forced out of the notch when the car is passing over a curve.

2. The combination in an anti-nosing device for railway cars, of a truck bolster; a body bolster pivotally mounted thereon; a curved notched plate on one of said parts; and a spring-pressed plunger having a roller carried by the other part, the notch being so located that when the car, of which the bolsters form a part, is traveling on a straight track, the roller will be located in the notch of the plate.

3. The combination in an anti-nosing device for railway cars, of a truck bolster; a body bolster pivotally mounted on the truck bolster; a curved notched plate secured to the truck bolster; a plunger mounted on the body bolster; a spring tending to force the plunger towards the curved plate; and a roller pivotally mounted on the plunger and bearing against the plate, the notch in the curved plate being so located that the roller will enter the notch when the car is traveling on a straight track.

4. The combination in an anti-nosing device for railway cars, of a truck bolster; a body bolster; a pivot plate secured to the body bolster and pivotally mounted on the truck bolster; a pivot pin; a curved plate on each side of the pivot and secured to the truck bolster, each plate being notched at the center; a projection on the pivot plate on each side of the center; a plunger mounted in the projection; a spring between the projection and the shoulder on the plunger; and a roller carried by each plunger and bearing against the edge of its curved plate, the upper portion of the plunger extending over the curved pate, the parts being so arranged that the roller of each plunger will be located in the notch of its plate when the car is traveling on a straight track.

5. The combination in an anti-nosing device for cars, of a truck bolster and a body bolster pivotally mounted thereon; a curved, notched rail located on one of said parts some distance from the pivot; and a spring-pressed plunger mounted on the other part and bearing against the curved rail and so located that it will extend into the notch in the rail when the car is traveling on a straight track.

MORRIS LINTON.